US012163361B2

(12) United States Patent
Doring et al.

(10) Patent No.: US 12,163,361 B2
(45) Date of Patent: Dec. 10, 2024

(54) ROLL-FORM TIE BAR AND GUIDE FOR CASEMENT WINDOW

(71) Applicant: Truth Hardware Corporation, Owatonna, MN (US)

(72) Inventors: Craig Doring, Owatonna, MN (US); Zach Pennaz, Owatonna, MN (US); Douglas A. Nolte, Owatonna, MN (US)

(73) Assignee: Truth Hardware Corporation, Owatonna, MN (US)

( * ) Notice: Subject to any disclaimer, the term of this patent is extended or adjusted under 35 U.S.C. 154(b) by 784 days.

(21) Appl. No.: 17/204,218

(22) Filed: Mar. 17, 2021

(65) Prior Publication Data

US 2021/0293062 A1 Sep. 23, 2021

Related U.S. Application Data

(63) Continuation-in-part of application No. 17/024,111, filed on Sep. 17, 2020, now Pat. No. 11,866,968.

(60) Provisional application No. 62/990,916, filed on Mar. 17, 2020.

(51) Int. Cl.
*E05C 9/22* (2006.01)
*E05C 9/02* (2006.01)

(52) U.S. Cl.
CPC .................. *E05C 9/22* (2013.01); *E05C 9/02* (2013.01); *E05Y 2900/148* (2013.01)

(58) Field of Classification Search
CPC ... E05C 9/22; E05C 9/02; E05C 9/006; E05C 9/1858; E05C 9/20; E05Y 2900/148; Y10S 292/20; Y10S 292/47; Y10S 292/51; Y10S 292/53; Y10S 292/54; Y10S 292/60
USPC .......................................... 49/394, 395, 192
See application file for complete search history.

(56) References Cited

U.S. PATENT DOCUMENTS

| | | | |
|---|---|---|---|
| 1,385,102 | A | 7/1921 | Winters et al. |
| 2,548,578 | A | 4/1951 | Andersson et al. |
| 2,772,447 | A | 12/1956 | Preston |
| 2,866,238 | A | 12/1958 | Lamb |
| 2,924,476 | A | 2/1960 | Deane |
| 3,949,525 | A | 4/1976 | Bates et al. |
| 4,059,298 | A | 11/1977 | Van Klompenburg |
| 4,148,106 | A | 4/1979 | Gallien |

(Continued)

FOREIGN PATENT DOCUMENTS

| | | | | |
|---|---|---|---|---|
| CA | 2 364 823 | A1 | 6/2002 | |
| CA | 2820240 | A1 * | 1/2014 | ......... E05D 13/1276 |

(Continued)

OTHER PUBLICATIONS

DE102008018319A1, Espacenet machine translation of description and claims, Nov. 20, 2008 (Year: 2023).*

(Continued)

*Primary Examiner* — Kristina R Fulton
*Assistant Examiner* — Steven A Tullia
(74) *Attorney, Agent, or Firm* — Bradley J. Thorson

(57) ABSTRACT

A casement window lock and tie bar assembly including a flexible guide pre-formed with an arcuate deflection. The guide receives a tie bar having a c-shaped cross-section. The arcuate deflection of the guide causes the guide to be frictionally held in an initial position on the longitudinal axis of tie bar. When fasteners are tightened to attach the guide to a window frame, the guide is flattened to enable the tie bar to freely slide on the guide.

8 Claims, 17 Drawing Sheets

(56) References Cited

U.S. PATENT DOCUMENTS

| | | | | |
|---|---|---|---|---|
| 4,429,910 | A | 2/1984 | Anderson | |
| 4,602,457 | A | 7/1986 | Kreusel | |
| 4,621,847 | A | 11/1986 | Paulson et al. | |
| 4,739,583 | A | 4/1988 | Tonsmann et al. | |
| 4,803,808 | A | 2/1989 | Greisner | |
| 4,898,409 | A * | 2/1990 | Carter | E05C 9/02 292/54 |
| 4,980,946 | A | 1/1991 | Versani et al. | |
| 4,991,886 | A | 2/1991 | Nolte et al. | |
| 5,045,265 | A | 9/1991 | Pettit | |
| 5,118,145 | A | 6/1992 | Tucker | |
| 5,165,741 | A | 11/1992 | Everett | |
| 5,203,597 | A | 4/1993 | Wheelock | |
| 5,297,812 | A * | 3/1994 | Dogat | A63C 9/00 280/633 |
| 5,318,333 | A | 6/1994 | Dreifert et al. | |
| 5,370,428 | A | 12/1994 | Dreifert et al. | |
| 5,560,084 | A * | 10/1996 | Baker | E05C 17/28 16/193 |
| 5,603,538 | A | 2/1997 | Evers | |
| 5,642,909 | A | 7/1997 | Swan et al. | |
| D388,689 | S | 1/1998 | Bauman et al. | |
| D390,445 | S | 2/1998 | Johnson et al. | |
| 5,730,477 | A * | 3/1998 | Nagy | E05C 9/22 292/DIG. 20 |
| 5,741,031 | A | 7/1998 | Bauman et al. | |
| 5,778,602 | A | 7/1998 | Johnson et al. | |
| 5,839,767 | A | 11/1998 | Piltingsgrud | |
| 5,927,767 | A | 7/1999 | Smith et al. | |
| 6,135,511 | A | 10/2000 | Smith et al. | |
| 6,161,881 | A | 12/2000 | Babka et al. | |
| 6,367,853 | B1 | 4/2002 | Briggs | |
| 6,477,810 | B2 | 11/2002 | Van De Keuken | |
| 6,651,389 | B2 | 11/2003 | Minter et al. | |
| 6,763,550 | B2 * | 7/2004 | Regnier | E05F 11/382 16/93 R |
| 6,837,004 | B2 | 1/2005 | Annes | |
| 7,004,515 | B2 | 2/2006 | Timothy | |
| 7,014,227 | B2 | 3/2006 | Strangward et al. | |
| 7,219,469 | B2 | 5/2007 | DiFrancesco | |
| 7,340,860 | B2 | 3/2008 | Balbo Di Vinadio | |
| 7,452,014 | B2 | 11/2008 | etter | |
| 7,617,707 | B2 | 11/2009 | Chiang | |
| 7,624,539 | B2 | 12/2009 | Speyer et al. | |
| 7,627,987 | B2 | 12/2009 | Thielmann et al. | |
| 7,665,245 | B2 | 2/2010 | Speyer et al. | |
| 7,685,774 | B2 | 3/2010 | Thielmann | |
| 7,685,775 | B2 | 3/2010 | Speyer et al. | |
| 7,685,776 | B2 | 3/2010 | Speyer et al. | |
| 7,707,773 | B2 | 5/2010 | Thielmann et al. | |
| 7,708,322 | B2 | 5/2010 | Timothy et al. | |
| 7,823,935 | B2 | 11/2010 | Norris et al. | |
| 7,946,633 | B2 | 5/2011 | Minter | |
| 8,333,413 | B2 | 12/2012 | Bourgoin et al. | |
| 8,353,541 | B2 | 1/2013 | Minter | |
| 8,448,996 | B2 | 5/2013 | Lake et al. | |
| 8,561,260 | B2 * | 10/2013 | Baker | E05D 15/16 16/401 |
| 8,640,384 | B2 | 2/2014 | Curtis | |
| 9,121,209 | B2 * | 9/2015 | Baker | E05D 13/1276 |
| 9,151,094 | B2 * | 10/2015 | Lambertini | E05C 9/02 |
| 9,175,506 | B2 * | 11/2015 | Bauman | E05C 3/004 |
| 9,181,746 | B2 * | 11/2015 | Nguyen | E05C 9/1808 |
| 9,217,266 | B2 | 12/2015 | Curtis | |
| 10,557,287 | B2 * | 2/2020 | Zaccaria | E05C 9/185 |
| 2005/0134061 | A1 * | 6/2005 | Milo | E05B 15/022 292/340 |
| 2007/0000293 | A1 | 1/2007 | Daniels et al. | |
| 2008/0016782 | A1 * | 1/2008 | Balbo Di Vinadio | E05C 9/22 49/192 |
| 2018/0058118 | A1 * | 3/2018 | Minter | E05C 9/028 |

FOREIGN PATENT DOCUMENTS

| | | | | | |
|---|---|---|---|---|---|
| CN | 203654892 | U * | 6/2014 | E05C 9/185 |
| DE | 2217458 | A1 * | 4/1972 | E05C 9/22 |
| DE | 2313690 | C2 * | 11/1987 | E05B 17/0012 |
| DE | 19503064 | C1 * | 3/1996 | E05C 9/22 |
| DE | 19809698 | A1 * | 9/1999 | E05C 9/004 |
| DE | 19906758 | A1 * | 10/1999 | E05C 9/004 |
| DE | 19823803 | A1 * | 12/1999 | E05C 9/004 |
| DE | 19829077 | A1 * | 1/2000 | E05C 9/20 |
| DE | 10012735 | A1 * | 9/2001 | E05C 9/22 |
| DE | 60104460 | T2 * | 8/2005 | B23P 15/00 |
| DE | 102008018319 | A1 * | 11/2008 | E05C 9/1833 |
| DE | 202007009997 | U1 * | 12/2008 | E05C 9/22 |
| DE | 102011078858 | A1 * | 1/2013 | E05C 9/1858 |
| DE | 202013100319 | U1 * | 6/2014 | E05C 9/004 |
| DE | 102015206906 | A1 * | 10/2016 | |
| EP | 0711894 | A2 * | 9/1995 | E05C 9/20 |
| EP | 1072745 | A1 * | 1/2001 | E05C 9/006 |
| EP | 1318258 | A2 * | 6/2003 | E05C 9/006 |
| EP | 1479862 | A2 * | 11/2004 | E05C 9/006 |
| EP | 1936081 | A2 * | 6/2008 | E05C 9/006 |
| EP | 2295684 | A1 * | 3/2011 | E05C 9/004 |
| FR | 2938888 | A1 * | 5/2010 | E05C 9/004 |
| GB | 1393565 | A * | 5/1975 | E05C 9/006 |
| GB | 2335229 | A * | 9/1999 | E05C 9/22 |
| GB | 2384816 | A * | 8/2003 | E05C 9/006 |
| GB | 2484413 | A * | 4/2012 | E05C 9/004 |
| GB | 2513121 | A * | 10/2014 | E05C 9/185 |
| GB | 2546332 | A * | 7/2017 | E05B 15/0006 |
| JP | 02204588 | A * | 1/1989 | E05B 3/50 |
| WO | WO-03037453 | A1 * | 5/2003 | A63C 9/003 |
| WO | WO-2008119460 | A1 * | 10/2008 | E05C 9/185 |
| WO | WO-2008135188 | A2 * | 11/2008 | E05C 9/1833 |
| WO | WO-2011100280 | A1 * | 8/2011 | E05D 13/00 |
| WO | WO-2012143792 | A1 * | 10/2012 | E05C 9/006 |

OTHER PUBLICATIONS

Related U.S. Appl. No. 17/024,111, filed Sep. 17, 2020, and entitled "Tie Bar and Guide for Casement Window".

* cited by examiner

ROLL-FORM TIE BAR AND GUIDE FOR CASEMENT WINDOW

RELATED APPLICATIONS

The present application is a continuation-in-part of U.S. application Ser. No. 17/024,111 filed Sep. 17, 2020, entitled TIE BAR AND GUIDE FOR CASEMENT WINDOW, and further claims the benefit of U.S. Provisional Application No. 62/990,916 filed Mar. 17, 2020, and entitled ROLL-FORM TIE BAR AND GUIDE FOR CASEMENT WINDOW, both of said applications being hereby incorporated herein in their entirety by reference.

TECHNICAL FIELD

The present invention relates to locks for casement windows, and more specifically to tie bars for casement window lock mechanisms.

BACKGROUND

Multi point sash lock systems for casement windows are well known and are commonly provided for security and to inhibit water entry and air infiltration in the window. These systems typically have a single operating control, usually a lever. The operating control is linked to a tie bar mounted on the window frame that allows activation of remote locking points in addition to the main locking point. Operation of the lever causes the tie bar to move longitudinally, usually vertically along the long axis of the window, so that locking points on the tie bar engage keepers on the sash to inhibit opening of the sash. Tie bar guides are used to secure the tie bar to the frame of the window, preventing transverse movement of the tie bar while permitting the tie bar to move longitudinally.

Increasingly, self-locating tie bar guides are utilized when tie bars are installed in casement windows. Self-locating tie bar guides simplify the construction and assembly of casement windows and doors. Self-locating tie bar guides are prepositioned at desired locations along the length of the tie bar until they are secured, typically by screws, to the sash, window frame or door. Self-locating tie bar guides eliminate the need to either pre-drill holes that locate the guide securing screws or to build jigs or fixtures to hold the guides in place during the assembly process. They thus facilitate and speed assembly of the locking mechanism with the window or door. They also prevent the guides from sliding off the tie bar prior to assembly.

There are many prior-art tie bar systems that have self-locating tie bar guides. Self-locating tie bar guides are positioned along the tie bar at predefined locations and are secured to the tie bar in such a way as to stay in position until the tie bar guides are secured to the sash and the mechanism is operated.

Some commonly used prior art self-locating tie bar guides include a tab, pin, or some other feature that is frangible and that is broken off when the lock is operated for the first time and the tie bar is moved longitudinally. Others have a detent feature that is engaged and disengaged every time the lock is operated. Still others have a locating feature that moves upon installation. These prior art designs, however, can be somewhat complex to assemble and install.

Many of these prior art designs involve the tie bar extending through an aperture in the guide. Because the guide has portions surrounding the tie-bar, the installed height of the assembly—that is the dimension in which the assembly extends away from the frame—is relatively large. The window frame profile must be designed to accommodate this large dimension, impairing the aesthetic appearance of the window and increasing the chance of water and air infiltration. Also, because the tic-bar extends through the guide, the locking points and guides must be located so that the locking points will not strike the guide when the tie bar is operated.

What is needed is a tie bar guide assembly for casement windows that addresses the shortcomings of prior devices.

SUMMARY

Embodiments of the present invention include a tie bar and guide assemblies that address the needs in the industry. In an embodiment, a roll form tie bar is provided that snaps on to a tie bar guide. The tie bar has locating openings that engage tabs on the tie bar guide to locate and secure the guide prior to installation. The tabs are depressed and disengaged when fasteners are used to secure the tie bar assembly to the window frame. The tie bar can include rivet locking points located close to the top and bottom of the tie bar to provide better security and increased stability for preventing water and air infiltration. The rivet locking points can be eccentrically shaped and can have features to enable selective adjustment to optimize the fit of the window sash within the frame. The snap-on design reduces the overall height of the tie bar assembly thereby enabling a closer fit of the sash within the frame and reducing the required width of the window frame profile. The tie bar can be roll formed from steel and openings can be cluster-punched to enable easy manufacture.

In further embodiments, a tie bar guide is provided that can slide onto or be snapped in place with a twisting motion. In other embodiments the attachment fasteners for the guide can be offset from the longitudinal axis of the tie bar to accommodate certain window profiles.

In an embodiment, a casement window lock tie bar and guide assembly includes an elongate tie bar having a longitudinal axis and a generally c-shaped cross-section defined by a top face, a pair of opposing sides, and a pair of projections. Each projection extends inwardly from a separate one of the opposing sides. The top face receives a locking point. The assembly further includes a flexible guide with a body portion pre-formed with an arcuate deflection and presenting a pair of lateral edges, each lateral edge defining a groove slidably receiving a separate one of the projections of the tic bar, the body portion further defining a pair of openings each adapted to receive a fastener to attach the guide to a window frame, wherein the arcuate deflection of the guide causes the guide to be frictionally held in an initial position on the longitudinal axis of tie bar. When the fasteners are tightened to attach the guide to the window frame, the guide is flattened to enable the tie bar to freely slide on the guide. The fasteners can be offset from the longitudinal axis of the tie bar, and the body portion of the guide can have a locating extension projecting from one of the lateral edges of the guide.

In an embodiment, a casement window lock tie bar and guide assembly includes an elongate tie bar having a longitudinal axis and a generally c-shaped cross-section defined by a top face, a pair of opposing sides, and a pair of projections. Each projection extends inwardly from a separate one of the opposing sides, and the top face receives a locking point and defines an aperture. The assembly further includes a guide with a body portion presenting a pair of lateral edges, each lateral edge defining a groove slidably receiving a separate one of the projections of the tie bar, the body portion further presenting a frangible tab, the frangible tab being received in the aperture of the tie bar.

The assembly can further include a guide interface adapted to attach to a window frame. The guide interface may have a locating extension.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
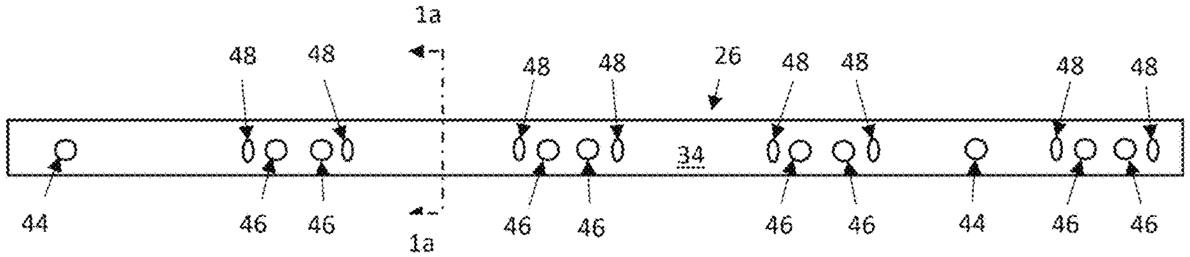
FIG. 1 is a top plan view of a roll form tie bar according to an embodiment of the invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 1A:
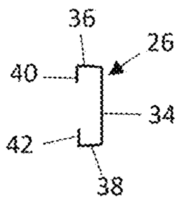
FIG. 1*a* is a cross-section of the tie bar of FIG. 1 taken at section 1*a*-1*a* of FIG. 1.

In FIGS. 1, 1*a*, and 2-14 there is depicted a tie bar and guide assembly 20 according to embodiments of the invention. Assembly 20 generally includes tie bar assembly 22 and guide 24. Tie bar assembly 22 generally includes roll-form tie bar 26 and rivet locking point 28. Roll-form tie bar 26 can be formed from stainless steel or other suitable metal and has a c-shaped cross-section as depicted in FIGS. 1 and 1*a* with planar top face 34, sides 36, 38, and inwardly directed projections 40, 42. Apertures can be formed through top face 34 via cluster punching or other suitable methods. These apertures can include lock point apertures 44, guide fastener apertures 46, and locating apertures 48. It will be appreciated that sets of guide fastener apertures 46 and locating apertures 48, and lock point apertures 44, may be disposed at standardized predetermined locations along the length of tie bar 26. This enables tie bar and guide assembly 20 to be manufactured in a limited number of variations while still fitting virtually all casement window sizes, thereby saving expense and effort.

Figure 1B:
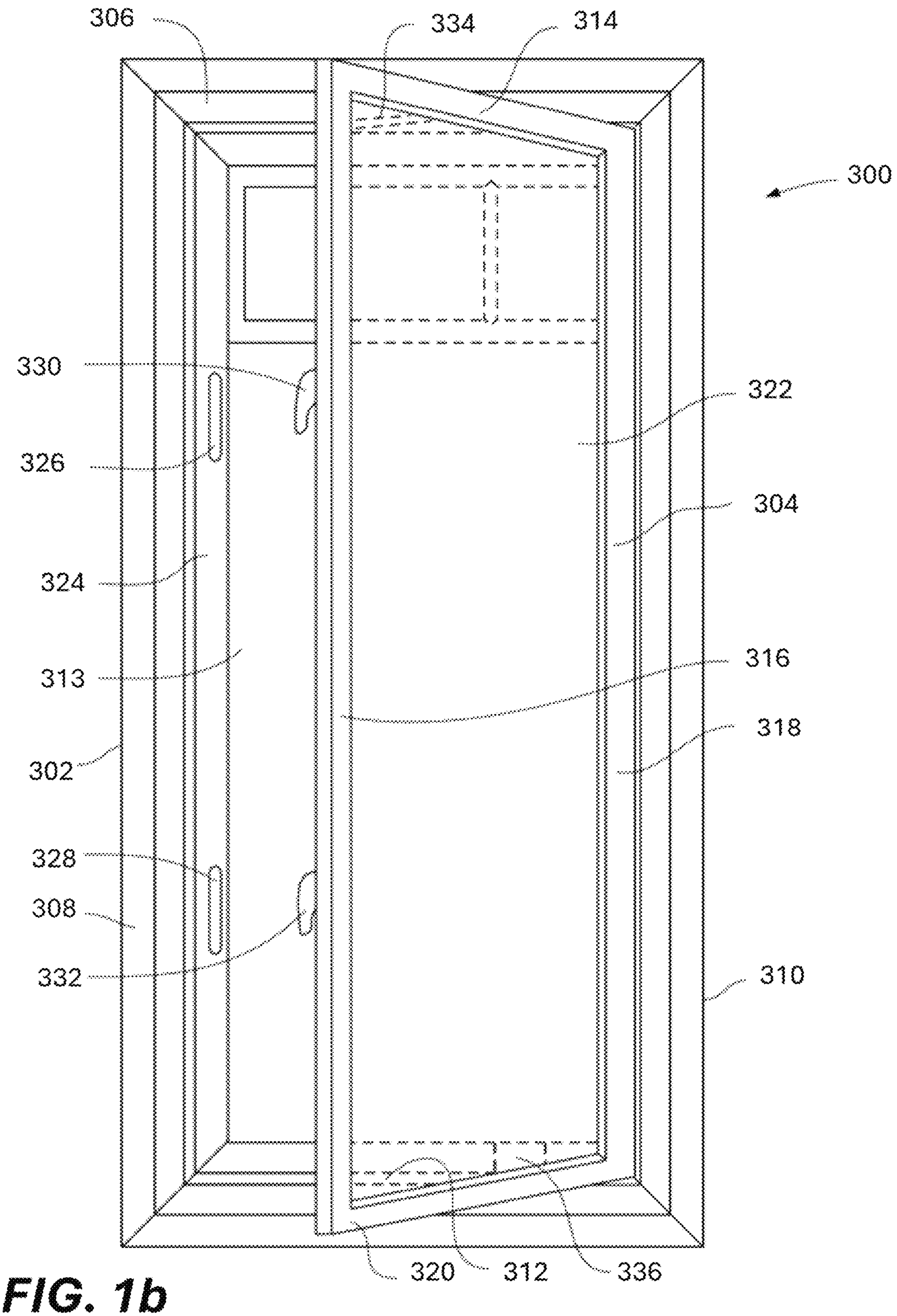
FIG. 1*b* is an elevation view of a casement window incorporating a tie bar and guide assembly according to embodiments of the invention.

FIG. 1*b* depicts a casement window 300 incorporating tic bar and guide assembly 20. Casement window 300 generally includes frame 302 and sash 304. Frame 302 generally includes top rail 306, side rails 308, 310, and bottom rail 312, and defines opening 313. Sash 304 generally includes top rail 314, side rails 316, 318, and bottom rail 320, receiving glass 322. Tie bar and guide assembly 20 is concealed inside enclosure 324, and is operated by a lever (not depicted). Enclosure 324 defines openings 326, 328, for admitting keepers 330, 332 when sash 304 is closed to close opening 313. Sash 304 is hinged to frame 302 with hinges 334 at the top and bottom, and is operated to open and close with operator 336.

Figure 2:
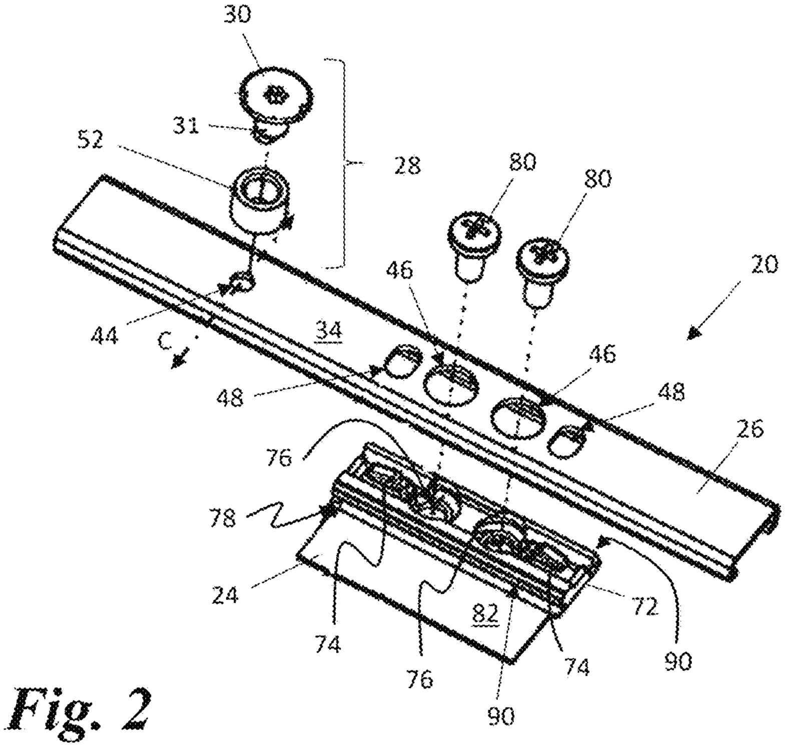
FIG. 2 is an isometric view of a tie bar and guide assembly according to an embodiment of the invention.

Rivet locking point 28 can include rivet 30 with an eccentrically located shank 31 as depicted in FIGS. 2-6, or a rivet 32 with a symmetrical cylindrical shank as depicted in FIGS. 7-11. In the embodiment of FIGS. 2-6, eccentrically located shank 31 is oriented about axis A, while main portion 50 is oriented about axis B which is offset from axis A as depicted in FIGS. 3*a* and 3*b*. Sleeve 52 is rotatably fitted on main portion 50. As rivet 30 is rotated about axis A, the location of rivet locking point 28 is shifted laterally generally parallel to axis C as depicted in FIG. 2 so as to engage and disengage keepers 130, 132, mounted on sash 104. Sleeve 52 rolls on main portion 50 as the rivet locking point 28 engages with the keeper so as to reduce friction.

Figure 7:
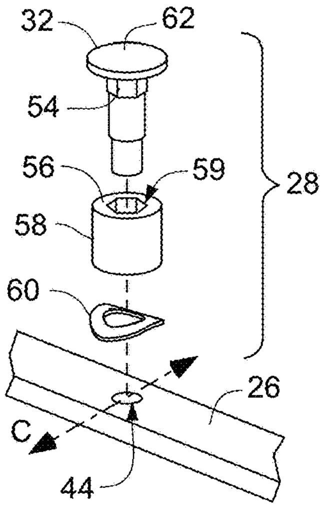
FIG. 7 is an exploded isometric view of an embodiment of an eccentric rivet locking point on the tie bar.
Figure 8:
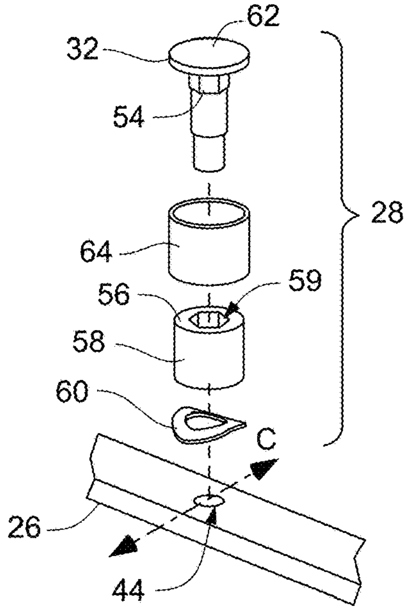
FIG. 8 is an exploded isometric view of another embodiment of an eccentric rivet locking point having a roller sleeve.

In the embodiments of FIGS. 7-8, rivet 32 has hexagonal flats 54 that engage conforming hexagonal aperture 56 in sleeve 58. Sleeve 58 has eccentrically located aperture 59. Spring washer 60 biases sleeve 58 toward head 62. As rivet 32 is rotated, the location of rivet locking point 28 is shifted laterally generally parallel to axis C due to eccentrically located aperture 59, so as to engage and disengage keepers 130, 132, mounted on sash 104. In the embodiment of FIG. 8, roller sleeve 64 is rotatably received on sleeve 58 so as to reduce rolling friction with the window sash keeper.

Figure 9:
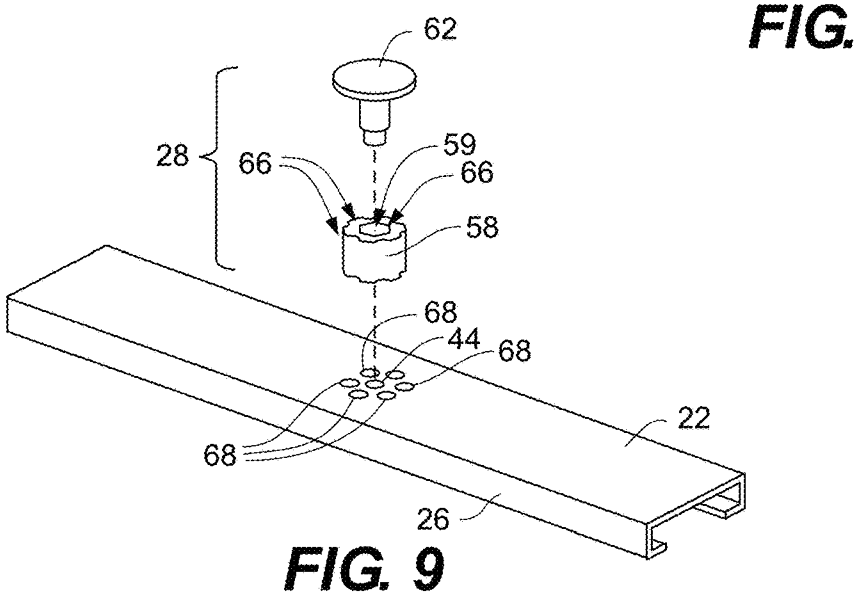
FIG. 9 is an exploded isometric view of another embodiment of an eccentric rivet locking point on the tie bar, wherein coined bumps on the tie bar and matching features on the sleeve enable rotation of the sleeve for adjustment in predetermined positions.
Figure 10:
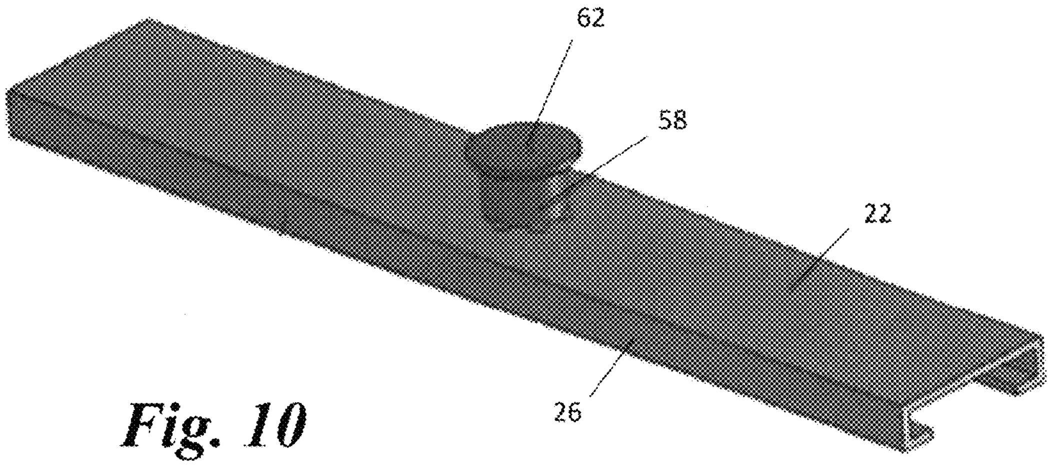
FIG. 10 is an isometric view of the rivet locking point of FIG. 9 in an assembled condition.

In the alternative embodiments of FIGS. 9-13, sleeve 58 has apertures 66 positioned about aperture 59. Apertures 66 could also be indentations that do not extend all the way through sleeve 58. In the embodiment of FIGS. 9 and 10 coined bumps 68 are formed on tie bar 22. As sleeve 58 and rivet 32 are rotated, coined bumps 68 engage apertures 66 to provide detents.

Figure 11:
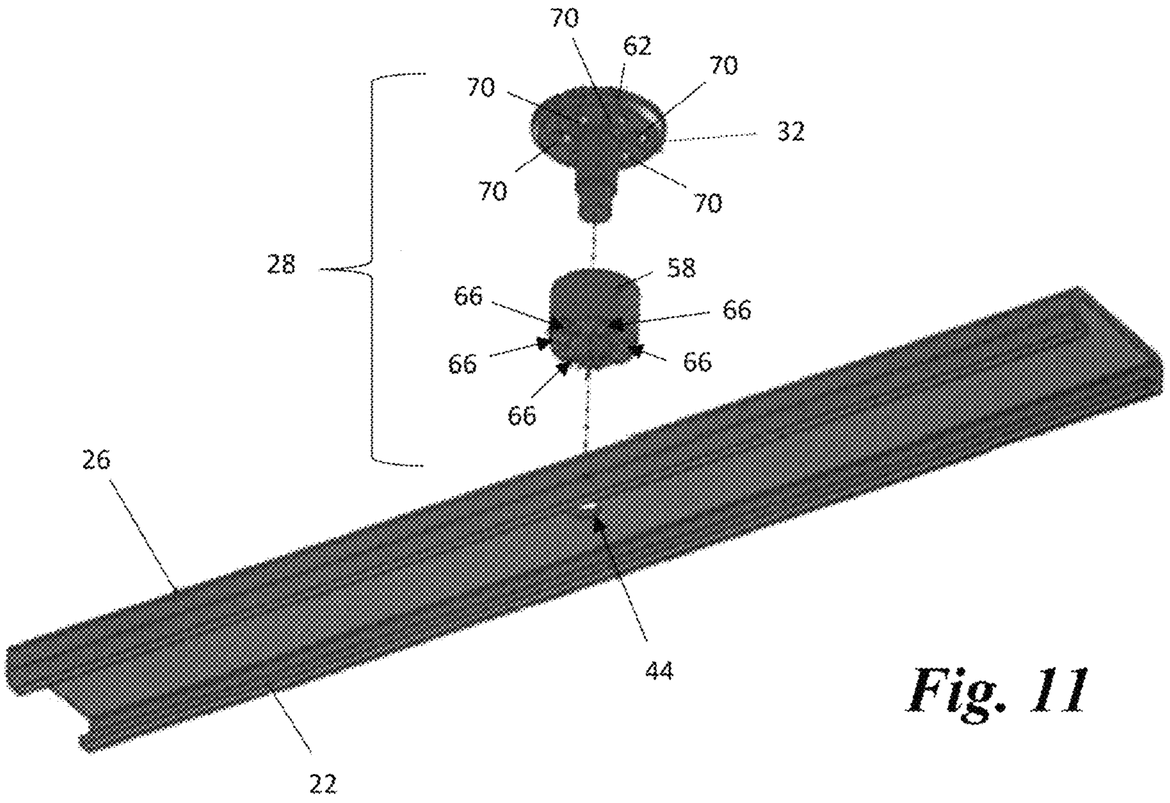
FIG. 11 is an exploded isometric view of another embodiment of an eccentric rivet locking point on the tie bar, wherein bumps on the mating surface of the sleeve enable rotation of the sleeve for adjustment in predetermined positions.
Figure 12:
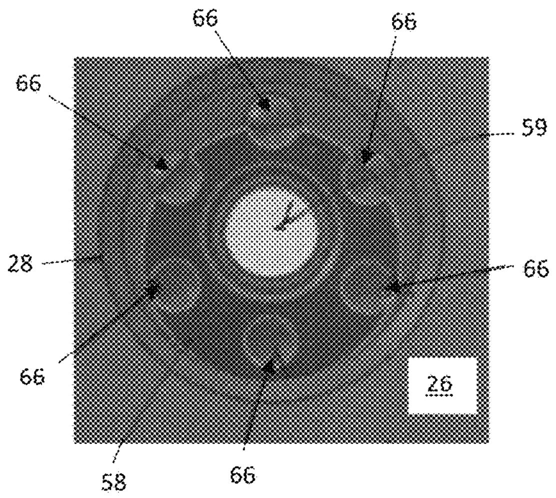
FIG. 12 is a top plan view of an eccentric rivet locking point sleeve in a first rotational position.
Figure 13:
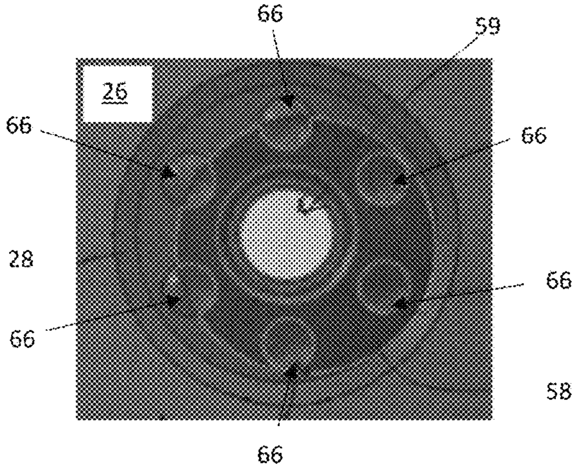
FIG. 13 is a top plan view of an eccentric rivet locking point sleeve in a second rotational position.
Figure 14:
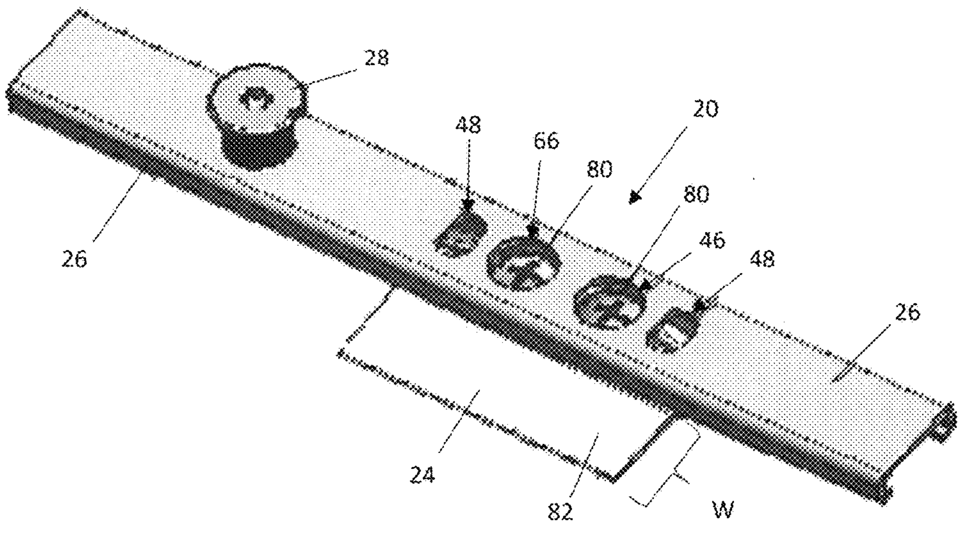
FIG. 14 is an isometric view of the tie bar assembly with the guide having a locating extension for locating the assembly on a window frame.

Instead of coined bumps 68 on tie bar 22, bumps 70 can be formed on the underside of head 62 that similarly engage with apertures 66 as depicted in FIG. 11. As depicted in FIGS. 12-13, the bumps 68, 70, engage with apertures 66 to provide discrete detents for the rotational location of sleeve 58.

Figure 5:
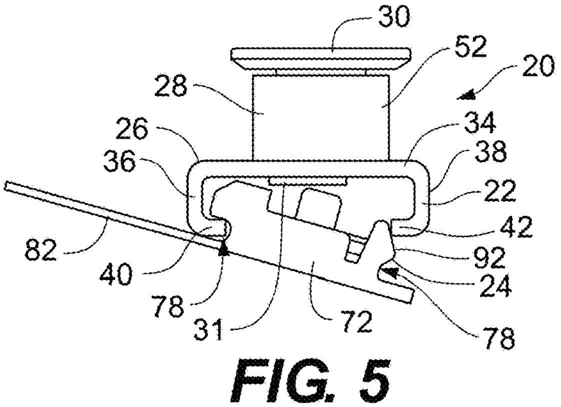
FIG. 5 is an end view of the tie bar assembly with the tie bar in position to snap on to the guide.

Guide 24 generally includes body portion 72, with resilient tabs 74 positioned adjacent fastening holes 76. Lateral grooves 78 are formed in the lateral edges 90 of guide 24 to receive projections 40, 42. Tie bar 22 can be snapped onto guide 24 as depicted in FIGS. 5 and 6 by advancing projection 40 into one of lateral grooves 78 and pressing down on tie bar 26 to enable projection 42 to slide over sloped portion 92 and engage with the other lateral groove 78.

Figure 3A:
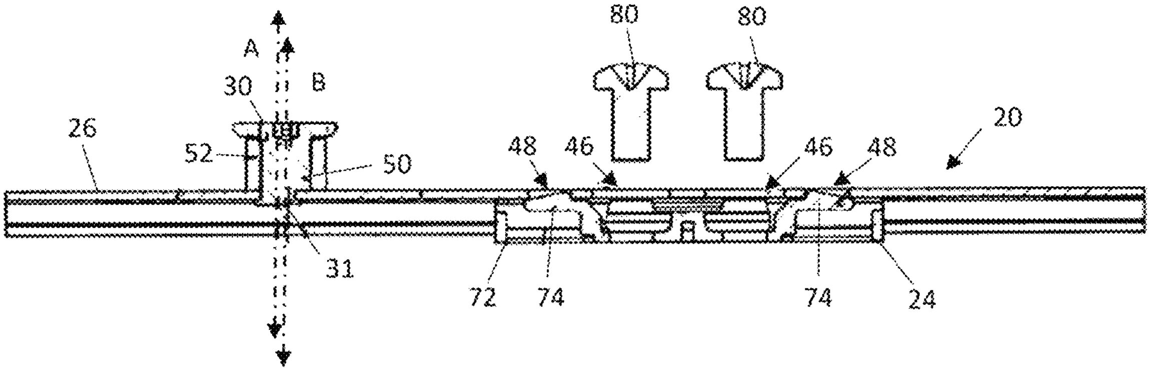
FIG. 3*a* is a cross-sectional view of the tie bar assembly of FIG. 2 depicting the resilient tabs of the guide engaging locating apertures in the tie bar prior to installation.
Figure 3B:
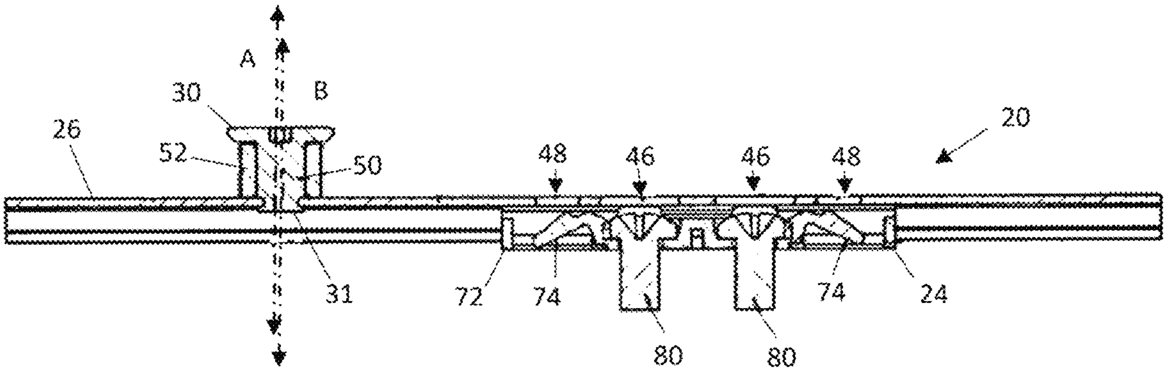
FIG. 3*b* is a cross-sectional view of the tie bar assembly of FIG. 2 depicting the resilient tabs of the guide deflected by fasteners so as to disengage from the locating apertures in the tie bar after installation.

Prior to installation on the casement window frame, tie bar 22 can be snapped onto guide 24 with tabs 74 engaged in locating apertures 48, thereby preventing guide 24 from sliding on tie bar 24. During installation, fasteners 80 are inserted through apertures 46 and holes 76 to secure guide 24 to the window frame. As fasteners 80 are tightened, tabs 74 are depressed so as to disengage from locating apertures 48 as depicted in FIGS. 3*a* and 3*b*. In the position of FIG. 3*b*, tie bar 22 can slide freely on guide 24. Locating extension 82 can be provided in various widths W to fit different window frame profiles. During installation, locating extension 82 can simply be butted against a facing surface of the window profile to precisely locate the assembly 20 on window frame 102 to properly engage keepers 130, 132. In addition, locking points 28 can be adjusted through the configurations described above to provide fine adjustment of sash engagement with the frame.

Figure 4A:
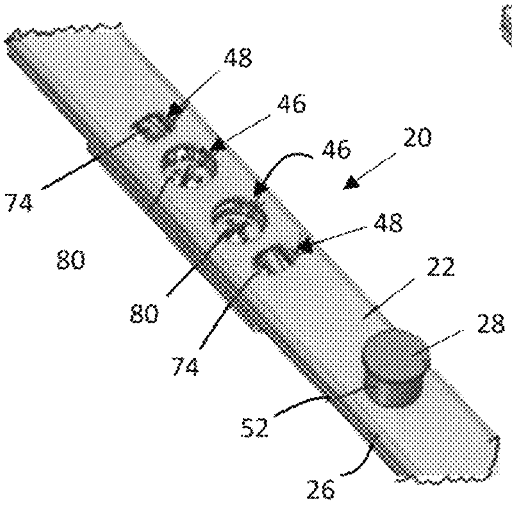
FIG. 4*a* is an isometric view depicting the tie bar assembly of FIG. 2 in a post-installation window-unlocked position after the resilient tabs have been deflected by fasteners to disengage from the tie bar.
Figure 4B:
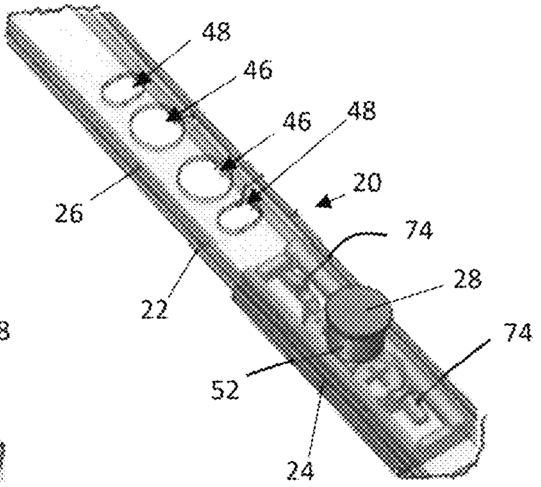
FIG. 4*b* is a post-installation isometric view of FIG. 2 with the tie bar shown in phantom and the window in a locked position, showing that the locking point locates above the tie bar guide thereby enabling improved security.

It will be appreciated that, as depicted in FIG. 4*b*, locking point 28 can slide over guide 24. In addition, tie bar and guide assembly 20 can be configured so that when the window is locked, locking point 28 is positioned directly over guide 24 as depicted. Security is improved over prior designs in which the locking point must be longitudinally displaced from the guide, since less bending load will be imparted to the tie bar upon any attempt to pry open the window. Also, locking points 28 can be located closer to the bottom and top of the window sash improving strength.

Figure 6:
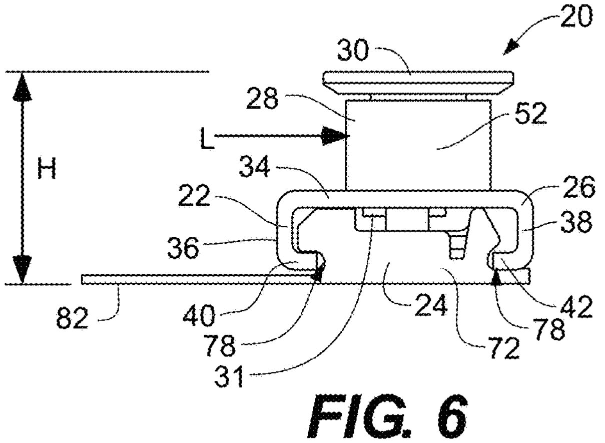
FIG. 6 is an end view of the tie bar assembly with the tie bar snapped on to the guide.

Further, as depicted in FIG. 6, the reduction in overall height H of tie bar and guide assembly 20 compared to prior art devices results in load L imposed from the sash keeper being closer to the window frame. This results in improved fit of the sash within the frame and improved strength and security. The lower height 1 also enables a narrower window frame profile, improving the aesthetic appearance of the window.

Figure 15:
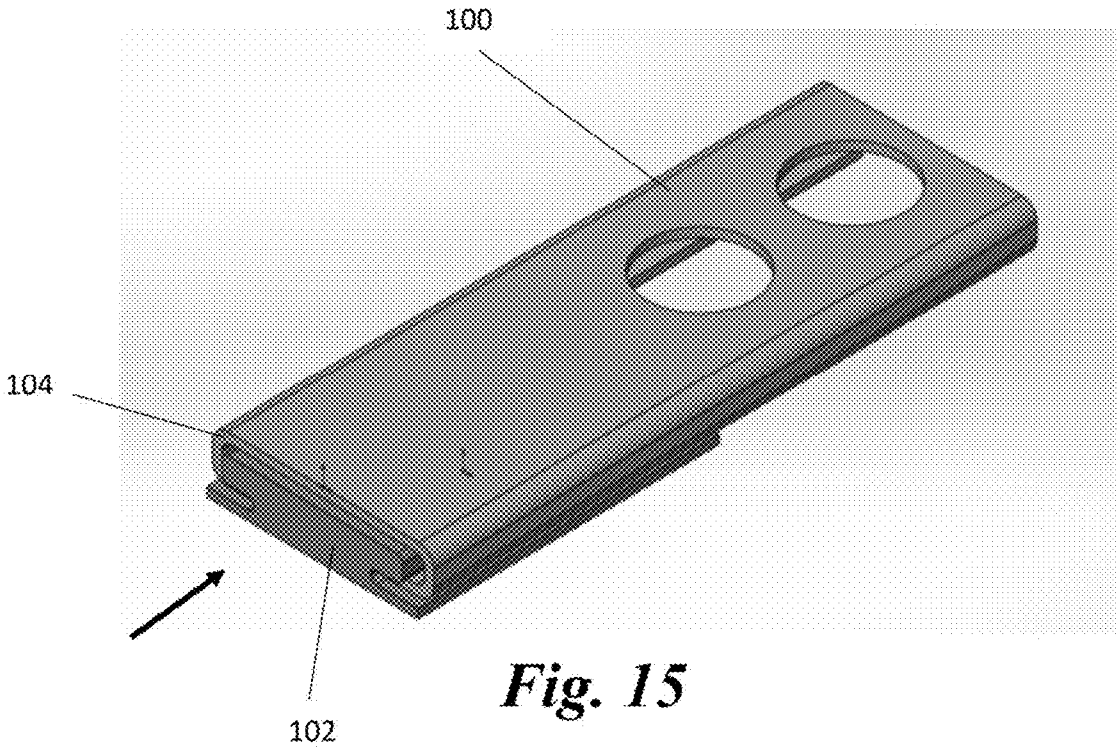
FIG. 15 is an isometric view of a tie-bar guide and tie-bar where the guide slides into place from the end of the roll-form tic bar.

FIG. 15 depicts an embodiment of a roll form tie bar 100 and tie bar guide 102 in which guide 102 can be slid into place from end 104 of tie bar 100 in the direction of the arrow.

Figure 16:
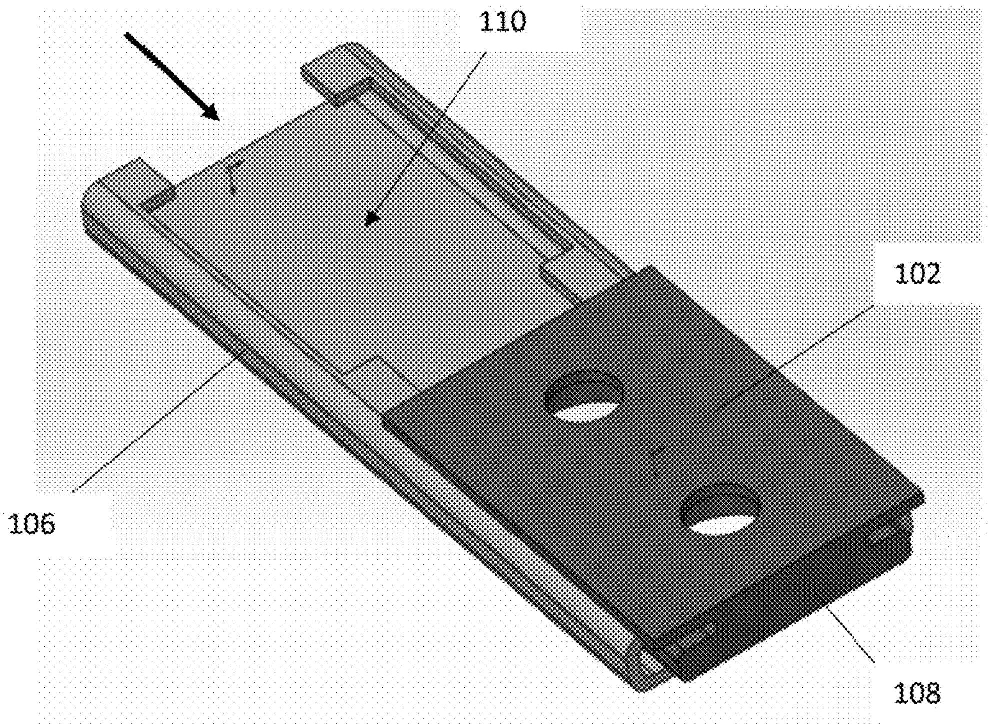
FIG. 16 is an isometric view of a tie-bar guide and tie-bar where the guide is inserted through a window cut in the tie bar and slides into place.

FIG. 16 depicts an embodiment of a roll form tie bar 106 and tie bar guide 102 in which engaging portion 108 of guide 102 can be inserted through window 110 formed in tie bar 106, and guide 102 slid into place on tie bar 106 in the direction of the arrow.

Figure 17A:
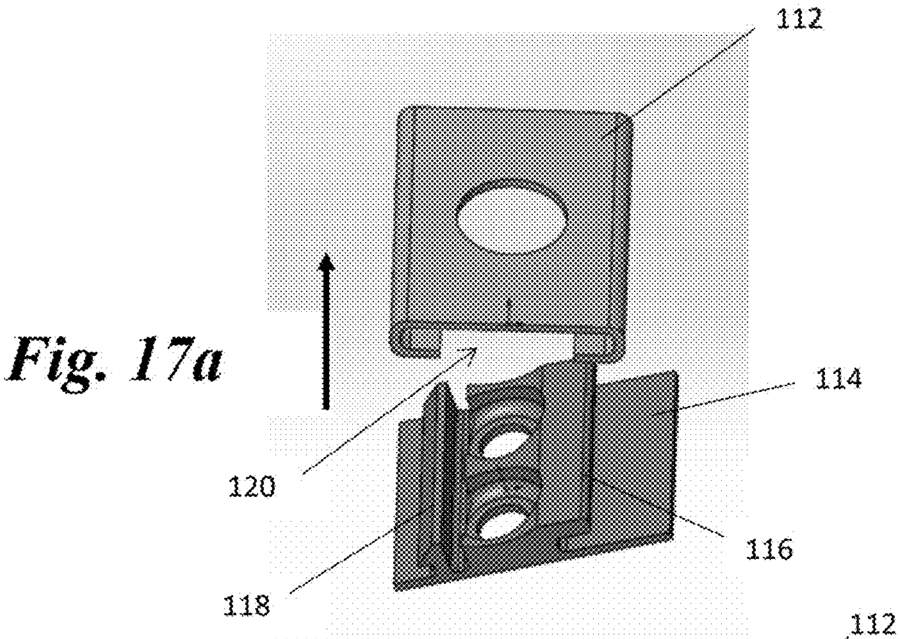
FIG. 17*a* is an isometric view of a tie-bar guide and tie-bar where the guide snaps into place in the roll-form tie bar.
Figure 17B:
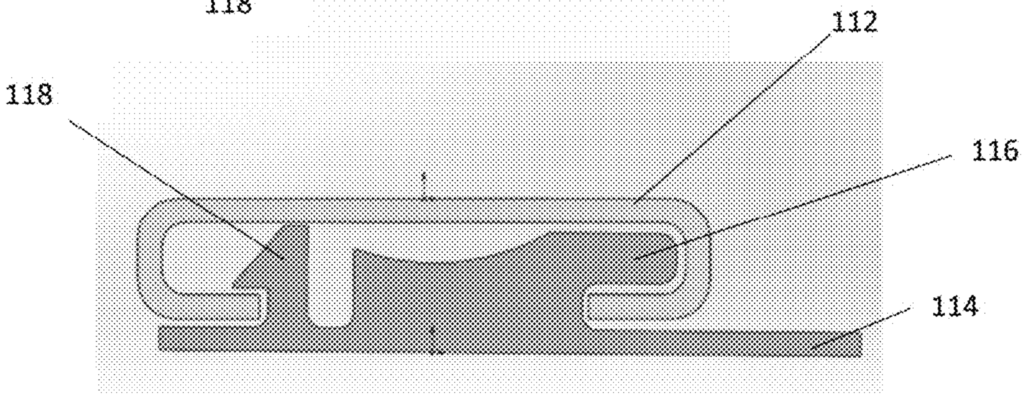
FIG. 17*b* is an end elevation view of the tie-bar guide and tie-bar of FIG. 17*a;*

FIGS. 17*a* and 17*b* depict an embodiment of a roll form tie bar 112 and tie bar guide 114. Tie bar guide 114 generally includes engaging lip 116 and securing projection 118. Guide 114 can be installed by advancing engaging lip 116 into channel 120 and pressing guide 114 upward in the direction of the arrow so that securing projection 118 deflects and snaps into place in channel 122.

Figure 18A:
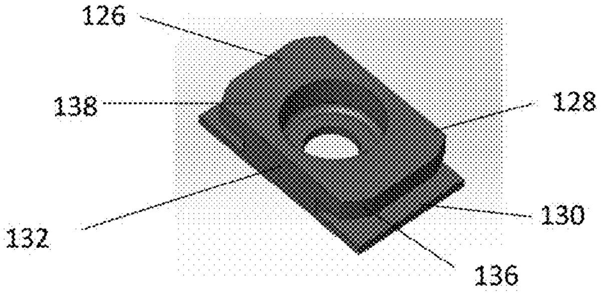
FIG. 18*a* is an isometric view of a tic-bar guide where the guide twists into place in the roll-form tie bar.
Figure 18B:
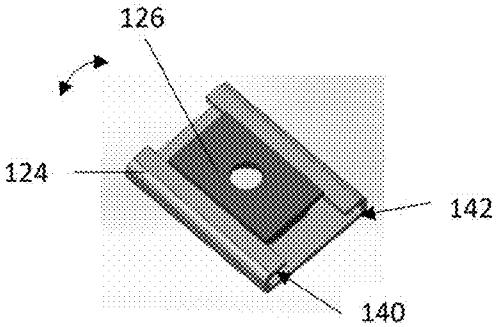
FIG. 18*b* is an isometric view of a tie-bar guide of FIG. 18*a* in a first installation position with a roll-form tie bar.
Figure 18C:
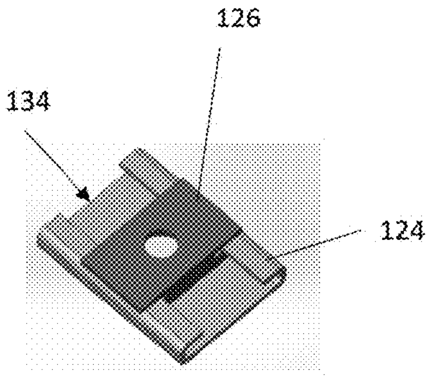
FIG. 18*c* is an isometric view of a tie-bar guide of FIG. 18*a* in a second installation position with a roll-form tic bar.

FIGS. 18*a*, 18*b* and 18*c* depict an embodiment of a roll-form tie bar 124 and tie bar guide 126. Tie bar guide 126 generally includes engaging portion 128 and exterior portion 130 with neck 132 extending therebetween. Guide 126 can be installed by advancing engaging portion 128 through gap 134 in tie bar 124 and twisting guide 126 as depicted by the arrow, so that projections 136, 138, of engaging portion 128 are received in channels 140, 142.

Figure 19A:
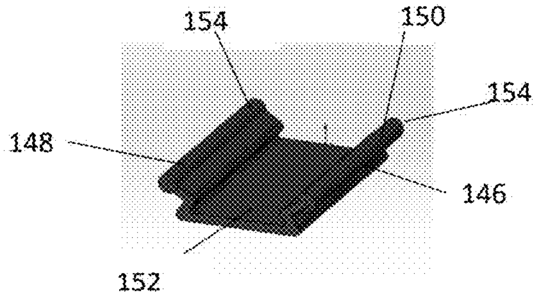
FIG. 19*a* is an isometric view of another embodiment of a tie-bar guide where the guide snaps into a roll-form tie bar.
Figure 19B:
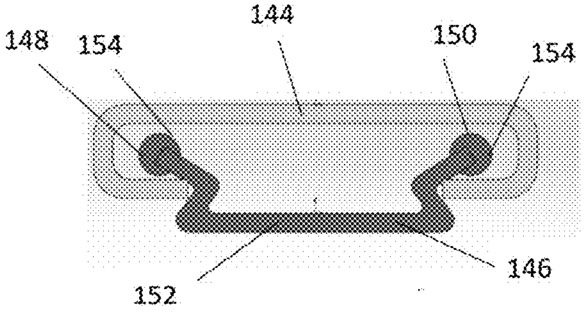
FIG. 19*b* is an end elevation view of the tie-bar guide of FIG. 19*a* with a tie-bar.

FIGS. 19*a* and 19*b* depict an embodiment of a roll form tie bar 144 and tie bar guide 146. Tie bar guide 146 generally includes engaging portions 148, 150, and exterior portion 152. Each engaging portion 148, 150, has a cylindrical wear portion 154 which may be overmolded or insert molded. Guide 146 can be installed by advancing tie bar guide 146 through an open end of tie bar 144.

Figure 20:
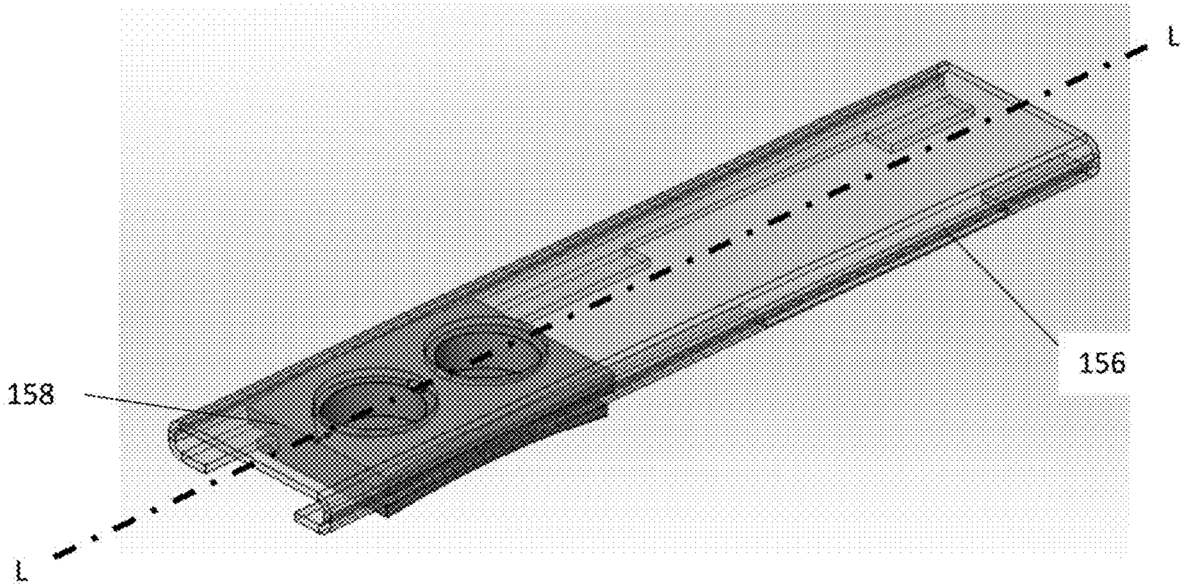
FIG. 20 is an isometric view of a tie-bar guide and tie-bar with the tie-bar shown in phantom, and where the guide has a predefined deflection prior to being secured.
Figure 21:
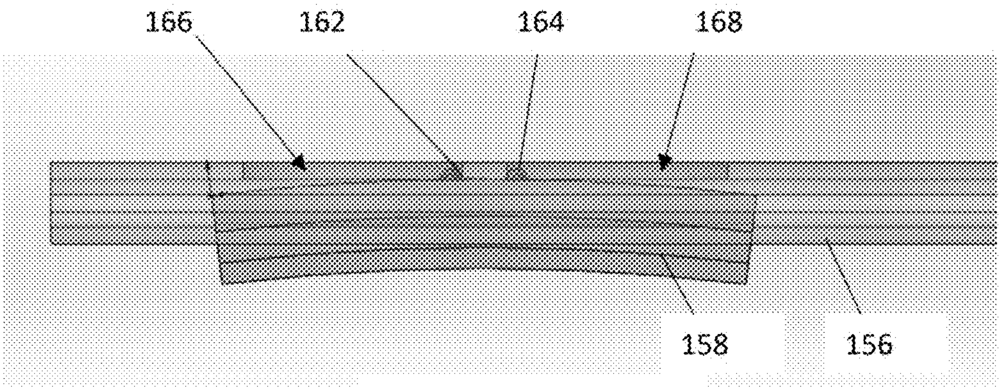
FIG. 21 is an elevation view of a tic-bar guide and tie-bar of FIG. 20.
Figure 22:
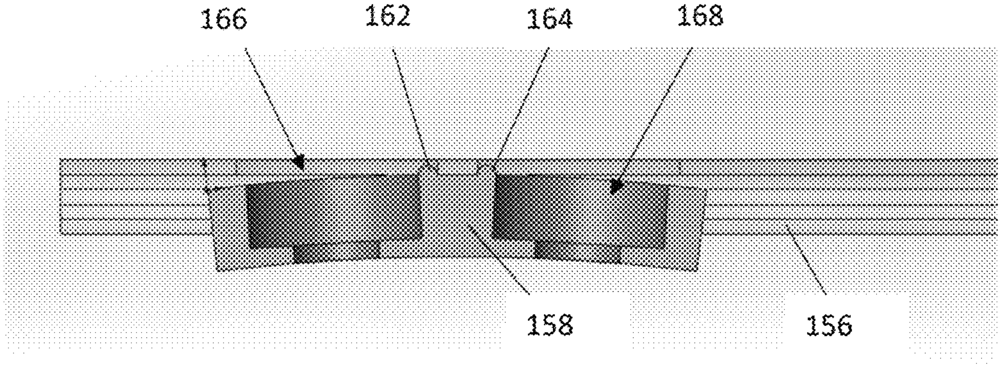
FIG. 22 is a cross-sectional elevation view of the tic-bar guide and tie-bar of FIG. 21.
Figure 23:
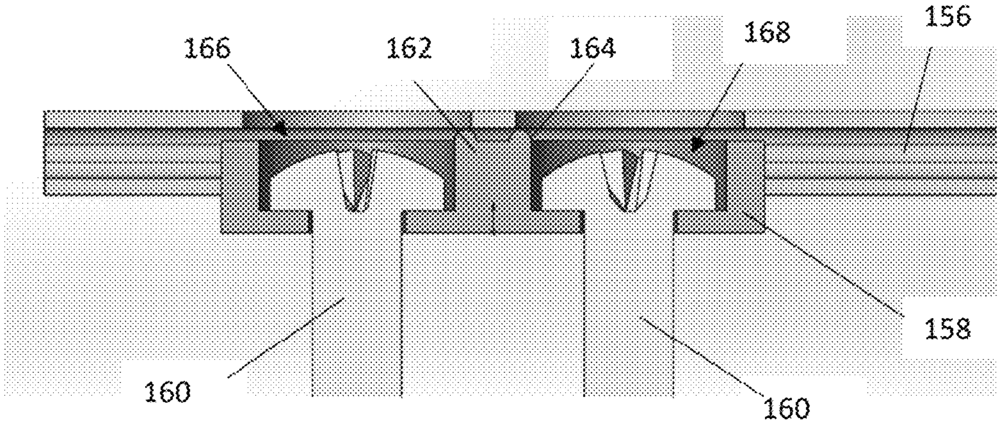
FIG. 23 is a cross-sectional elevation view of the tie-bar guide and tie-bar of FIG. 21 as installed on a window.

FIGS. 20-23 depict an embodiment of roll form tie bar 156 and tie bar guide 158. In this embodiment, tie bar guide 158 has a slight pre-formed arcuate deflection as depicted in FIGS. 20, 21, and 22. The spring biasing force provided by the arcuate deflection helps to hold tie bar guide 158 in position on the longitudinal axis L-L of tie bar 156 prior to guide 158 being secured with fasteners 160, as do projections 162, 164, which engage in tie bar apertures 166, 168. Once fasteners 160 are tightened to secure guide 158 to a window frame (not depicted), the guide is flattened as depicted in FIG. 23 so as to enable guide 158 to slide freely in tie bar 156.

Figure 24:
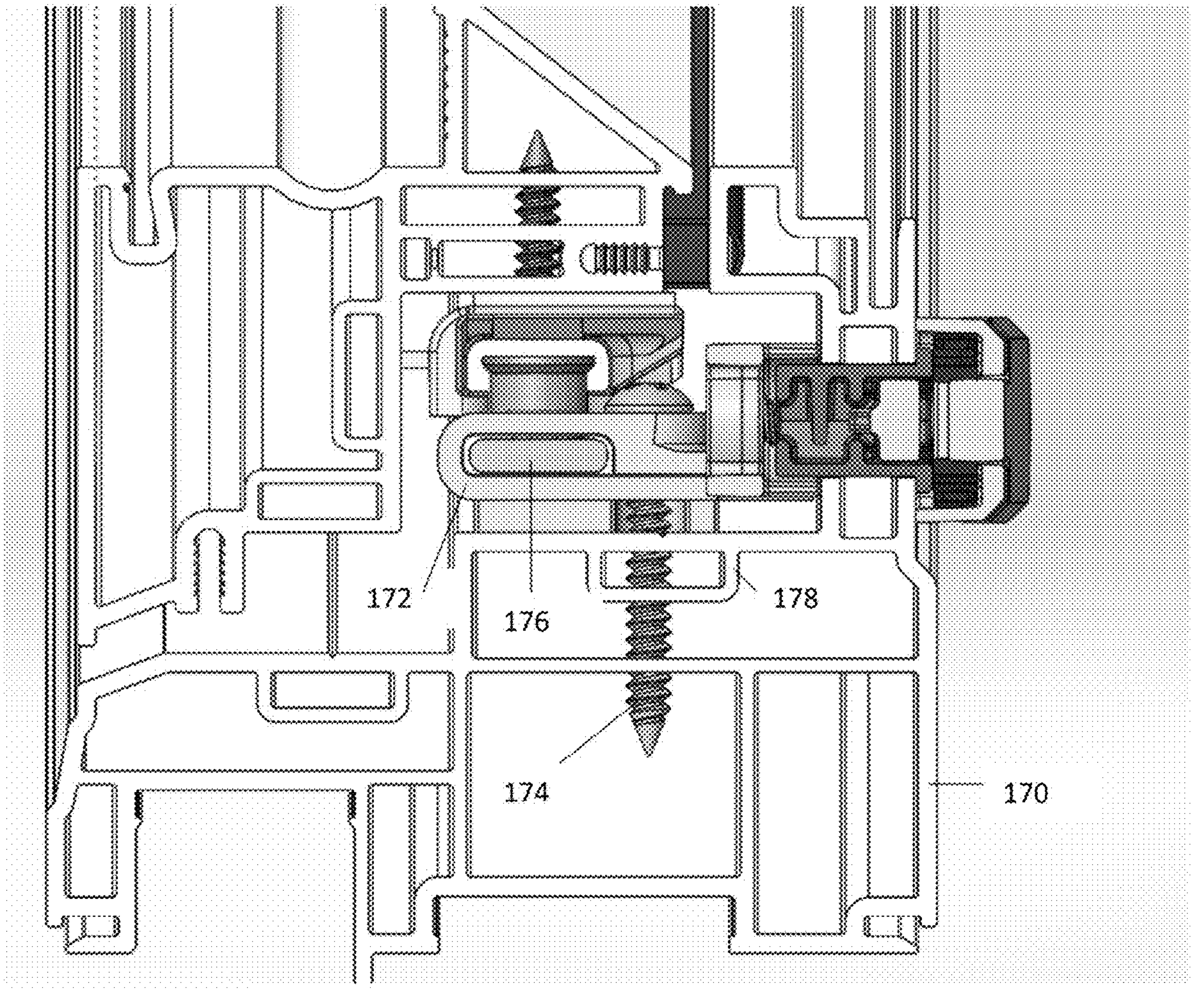
Fig. 24 (prior art)
FIG. 24 is a cross-sectional view of a window profile with double walled reinforcement, and a prior art tie bar and offset fastening tie bar guide located to accommodate the reinforcement.

FIG. 24 depicts a thin wall window profile 170 sometimes used in the window industry with a prior art tie bar and guide assembly 172. As depicted, the tie bar guide fastener 174 is offset from tie bar 176. Double wall portion 178 is provided in profile 170 to provide additional purchase for fastener 174 in the thin wall material.

Figure 25:
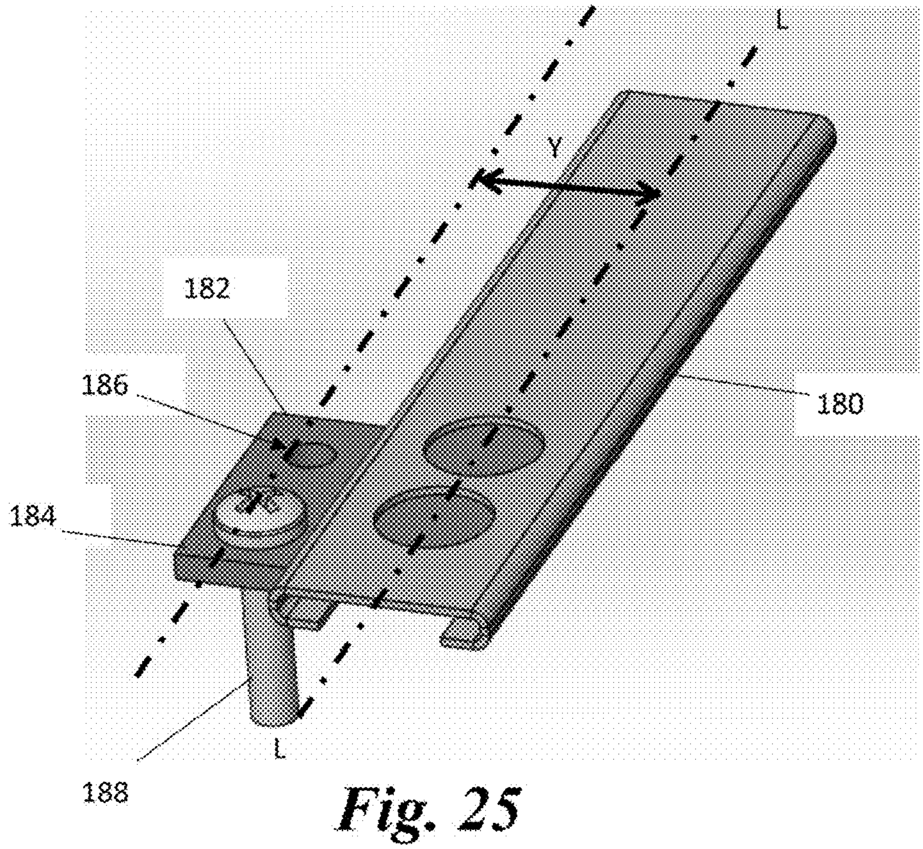
FIG. 25 is an isometric view of a tie bar and tie bar guide with offset fasteners according to an embodiment of the invention.
Figure 26:
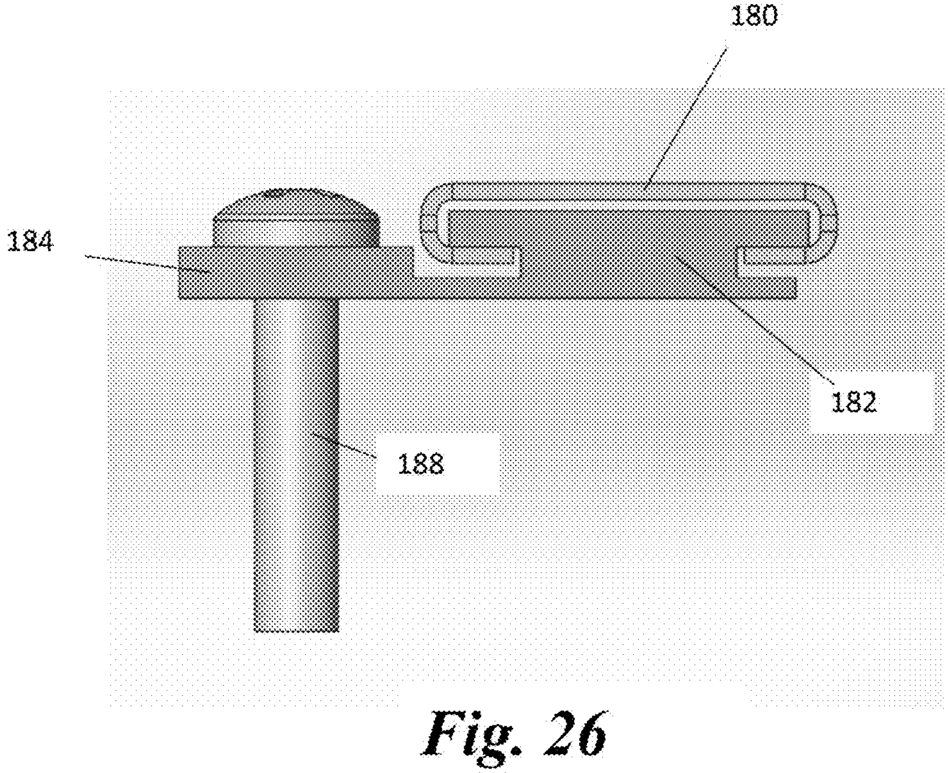
FIG. 26 is an end elevation view of the tie bar and tie bar guide of FIG. 25.

FIGS. 25-26 depict an offset fastener version of a roll form tie bar 180 and tie bar guide 182. Guide 182 has extension portion 184 defining fastener apertures 186. This configuration enables fasteners 188 to be offset by a distance Y from the longitudinal axis L-L of the tie bar 180 so that the roll form tie bar can be used in window profiles such as depicted in FIG. 24.

In FIGS. 27-34, there is depicted a further embodiment of a roll-form tie bar and guide assembly 200. Assembly 200 generally includes roll-form tie bar 202, guide 204, guide interface 206, keeper 208, and keeper interface 210. Tie bar 202 has planar top face 212, sides 214, 216, inwardly directed projections 218, 220, and rivet locking point 222. Top face 212 defines apertures 224, 226. Guide 204 defines lateral grooves 228, 230, that slidably receive projections 218, 220, of tie bar 202. Frangible tab 232 is received in one of apertures 224, 226, depending on whether a right-handed or left-handed installation is desired. Frangible tab 232 temporarily locates guide 204 on tie bar 202 until installation on a window.

Figure 27:
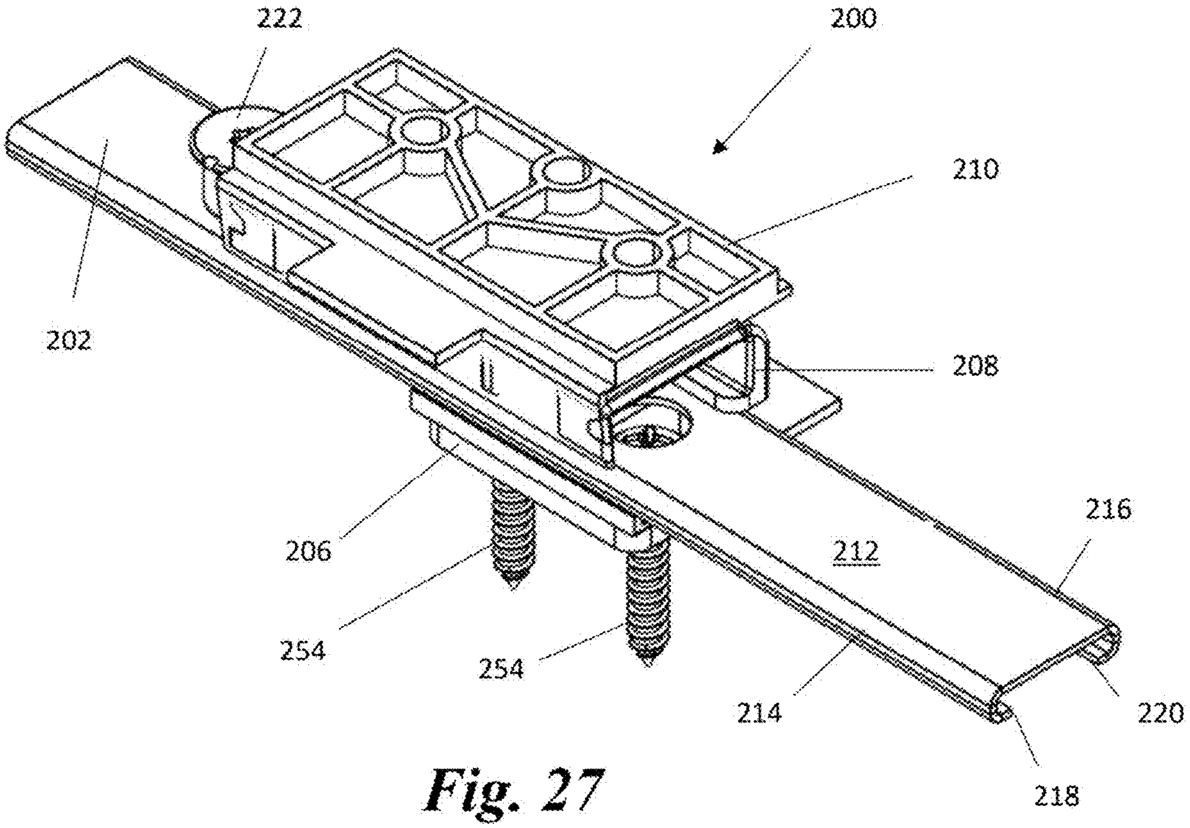
FIG. 27 is an isometric view of another embodiment of a tie bar, guide, and keeper assembly.
Figure 28:
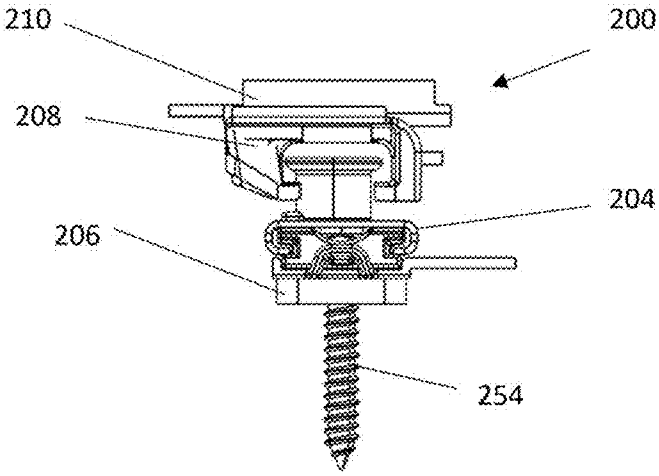
FIG. 28 is an end view of the assembly of FIG. 27.
Figure 29:
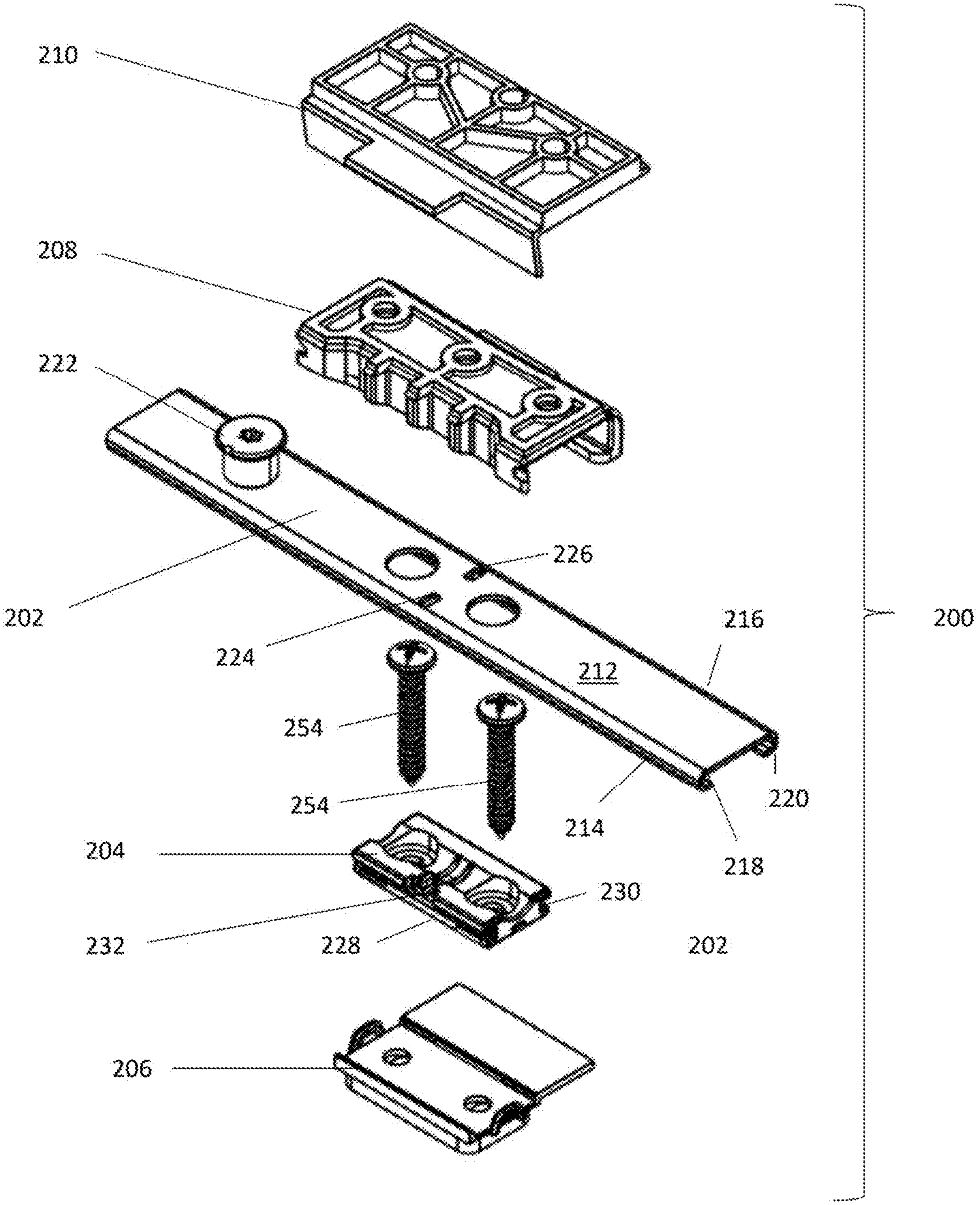
FIG. 29 is an exploded view of the assembly of FIG. 27.
Figure 30:
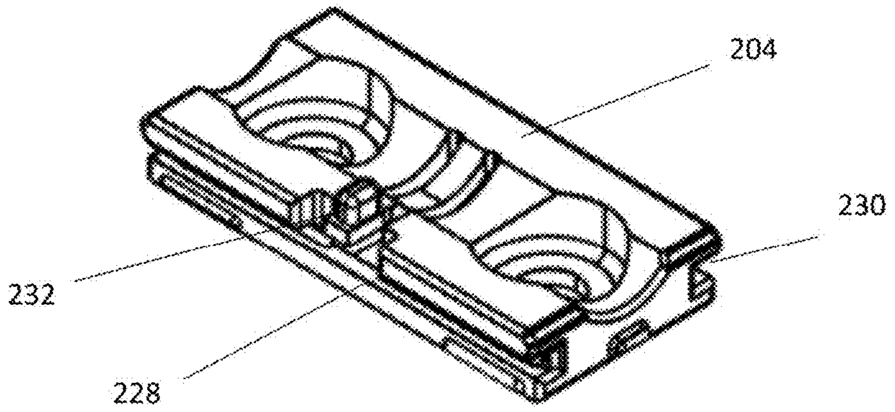
FIG. 30 is a top isometric view of the guide of the assembly of FIG. 27.
Figure 31:
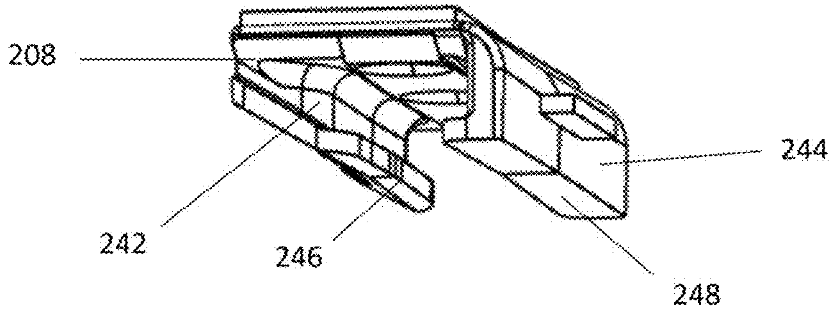
FIG. 31 is a bottom isometric view of the keeper of the assembly of FIG. 27.
Figure 32:
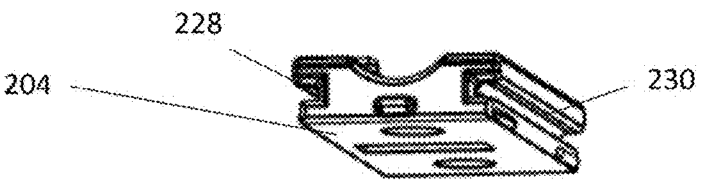
FIG. 32 is a bottom isometric view of the guide of the assembly of FIG. 27.
Figure 33:
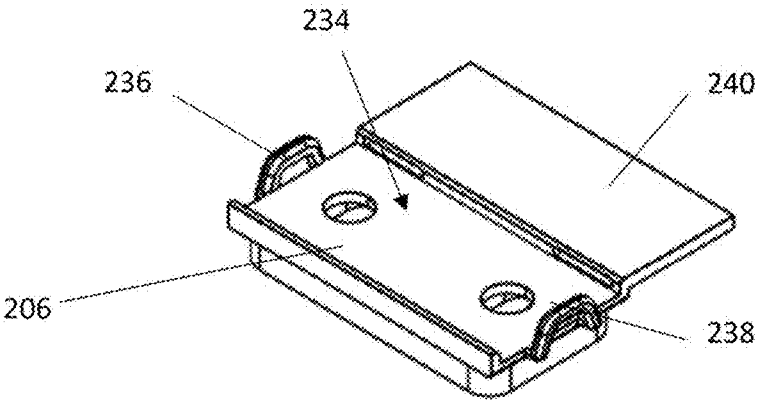
FIG. 33 is a top isometric view of the guide interface of the assembly of FIG. 27.
Figure 34:
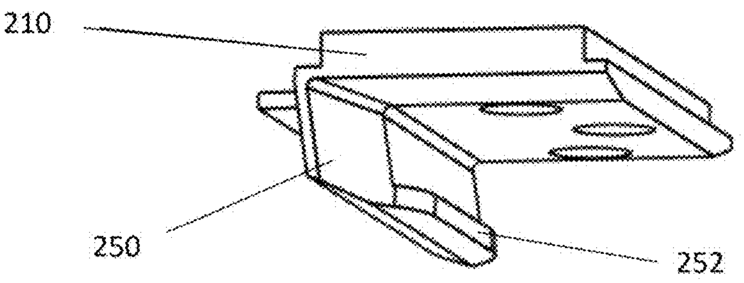
FIG. 34 is a bottom isometric view of the keeper interface of the assembly of FIG. 27.

Guide interface 206 defines recess 234 with locating projections 236, 238, at each end, and optional locating extension 240. Guide 204 is received in recess 234 between locating projections 236, 238, as depicted in FIGS. 27 and 29.

Keeper 208 has sidewalls 242, 244, with inwardly directed projections 246, 248. Keeper interface 210 has sidewall 250 with inwardly directed projection 252.

During installation, tie bar interface 206, guide 204, and tie bar 202 are secured to frame 102 of casement window 100, using fasteners 254. Keeper 208 and keeper interface 210 are secured to sash 104. With tie bar interface 206, guide 204, and tie bar 202 in position, tie bar 202 can be slid on guide 204 for the first time, breaking off frangible tab 232.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A casement window lock tie bar and guide assembly comprising:

an elongate tie bar having a longitudinal axis and a generally c-shaped cross-section defined by a top face, a pair of opposing sides, and a pair of projections, each projection extending inwardly from a separate one of the opposing sides, the top face receiving a locking point; and a flexible guide including a body portion pre-formed with an arcuate deflection and presenting a pair of lateral edges, each lateral edge defining a groove slidably receiving a separate one of the projections of the tie bar, the body portion further defining a pair of openings each adapted to receive a fastener to attach the guide to a window frame, wherein the arcuate deflection of the guide causes the guide to be frictionally held in an initial position on the longitudinal axis of tie bar.

2. The casement window lock tie bar and guide assembly of claim 1, wherein when the fasteners are tightened to attach the guide to the window frame, the guide is flattened to enable the tie bar to freely slide on the guide.

3. The casement window lock tie bar and guide assembly of claim 1, wherein the locking point is a rivet.

4. The casement window lock tie bar and guide assembly of claim 1, wherein the fasteners are offset from the longitudinal axis.

5. The casement window lock tie bar and guide assembly of claim 1, wherein the body portion of the guide has a locating extension projecting from one of the lateral edges of the guide.

6. A casement window lock tie bar and guide assembly comprising:

an elongate tie bar having a longitudinal axis and a generally c-shaped cross-section defined by a top face, a pair of opposing sides, and a pair of projections, each projection extending inwardly from a separate one of the opposing sides, the top face receiving a locking point and defining an aperture, the locking point being fixed in position on the tie bar; and a guide including a body portion presenting a pair of lateral edges, each lateral edge defining a groove slidably receiving a separate one of the projections of the tie bar, the guide adapted to be fixed to the frame of a window such that the tie bar is slidable on the guide, the body portion further presenting a frangible tab, the frangible tab being received in the aperture of the tie bar, the frangible tab being broken off the guide a first time the tie bar is slid on the guide.

7. The casement window lock tie bar and guide assembly of claim 6, further comprising a guide interface adapted to attach to a window frame.

8. The casement window lock tie bar and guide assembly of claim 7, wherein the guide interface has a locating extension.

* * * * *